Patented Apr. 27, 1943

2,317,832

UNITED STATES PATENT OFFICE 2,317,832

MANUFACTURE OF REACTION PRODUCTS FROM SULPHITE CELLULOSE WASTE LIQUOR

Fritz Vorsatz, Ludwigshafen-on-the-Rhine, Germany; vested in the Alien Property Custodian No Drawing. Application May 7, 1940, Serial No. 333,776. In Germany May 30, 1939

5 Claims. (Cl. 260—124)

The present invention relates to a process for the manufacture of reaction products from sulphite cellulose waste liquor.

I have found that new products suitable for commercial purposes are obtained by acting on sulphite cellulose waste liquor with water-insoluble organic compounds containing halogen atoms attached to alkyl groups.

Halogen compounds of the said kind are for example benzylchloride, ω-chlor-1-methylnaphthalene, allylchloride, dichlorethylene, dichlordiethylether and hexylbromide. The reaction is carried out by heating a mixture of sulphite cellulose waste liquor and a halogen compound of the said kind with such an amount of an alkaline or other acid-binding substance as corresponds to the amount of halogen. One or both substances may be gradually added to the sulphite cellulose waste liquor.

The substances thus obtained have substantially better tanning properties than the starting material and, in particular, can be used for tanning processes in baths of lesser acidity than lignin sulphonic acid. Moreover, they may be purified with particular ease, because they are more stable than lignin sulphonic acid and therefore capable of being precipitated without loss, by acidification alone or with an addition of relatively little salt. By this precipitation the tanning matter is freed from undesired admixtures, especially salts and sugars. The higher the proportion of halogen compound employed, the less soluble in water the product becomes, but the more resistant to acids it becomes. If the proportion of halogen compound is sufficiently high, the product is precipitated immediately. The new substances may be employed not only for tanning purposes, but also as emulsifying, wetting and levelling agents; they may also be added to washing preparations.

The following examples serve to illustrate how my present invention may be carried out in practice, but the invention is not restricted to these examples. The parts are by weight.

Example 1

1000 parts of sulphite cellulose waste liquor purified with sodium carbonate and evaporated to contain 24 per cent of tanning matter are heated with 52 parts of benzylchloride and a solution of 16 parts of sodium hydroxide in 50 parts of water under reflux cooling for some hours, while stirring.

200 parts of the product thus obtained are mixed with 70 parts of a mixture of equal parts of concentrated sulphuric acid and water; the precipitate is separated off, freed from the mother liquor and again dissolved in water. There are thus obtained 181 parts of a solution containing 26.2 per cent of tanning matter.

Example 2

500 parts of sulphite cellulose waste liquor purified with sodium carbonate and evaporated to contain 24 per cent of tanning matter are brought into reaction with 104 parts of benzylchloride and a solution of 32 parts of sodium hydroxide in 100 parts of water as described in Example 1. The precipitate thus formed is freed from the mother liquor, dissolved in water and brought to a pH-value of 3 by means of 17 parts of hydrochloric acid of 33 per cent strength. There are obtained 917 parts of a solution containing 15.5 per cent of tanning matter.

Example 3

100 parts of evaporated sulphite cellulose waste liquor as in Example 1 are caused to react with 10 parts of ethylene chloride and 8 parts of sodium hydroxide as described in Example 1. The reaction mixture is precipitated with 95 parts of a mixture of equal parts of concentrated sulphuric acid and water and further treated as described in Examples 1 and 2. After adding ammonia to establish a pH-value of 3, there are obtained 238 parts of a solution containing 10.85 per cent of tanning matter.

Example 4

720 parts of unpurified sulphite cellulose waste liquor neutralized with calcium hydroxide and evaporated to a content of 19 per cent of tanning matter are mixed with 39 parts of benzylchloride and 11 parts of calcium hydroxide suspended in 40 parts of water and further treated, as described in Example 1. 340 parts of the reaction mixture are mixed with 35 parts of a mixture of equal parts of concentrated sulphuric acid and water; the calcium sulphate precipitated is filtered off. There are obtained 287 parts of a solution containing 25.2 per cent of tanning matter.

I claim:

1. The process of treating sulphite cellulose waste liquor to produce conversion products, which comprises heating sulphite cellulose waste liquor with water insoluble organic compounds containing halogen atoms attached to alkyl groups and the addition of sufficient alkali to neutralize the liquor and bind the halogen, and adding sufficient acid to precipitate the conversion products.

2. A process for producing conversion products from cellulose waste liquor which comprises heating sulphite cellulose waste liquor, which has been neutralized and concentrated, with water insoluble organic compounds containing halogen atoms attached to alkyl groups in the presence of an alkaline substance which corresponds to the amount of halogen and adding sufficient acid to precipitate the conversion product.

3. A process as in claim 1 in which the water insoluble organic compound is allyl chloride.

4. A process as in claim 1 in which the water insoluble organic compound is ethylene chloride.

5. A process as in claim 1 in which the water insoluble organic compound is benzyl chloride.

FRITZ VORSATZ.